United States Patent
Darner et al.

(10) Patent No.: US 9,156,456 B2
(45) Date of Patent: Oct. 13, 2015

(54) BIASED DOUBLE CHECK VALVE FOR BRAKE SYSTEM

(71) Applicant: Bendix Spicer Foundation Brake LLC, Elyria, OH (US)

(72) Inventors: Brett S. Darner, Wellington, OH (US); Ken E. Scheckelhoff, Elyria, OH (US); Ronald S. Plantan, Westlake, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 127 days.

(21) Appl. No.: 13/956,141

(22) Filed: Jul. 31, 2013

(65) Prior Publication Data

US 2015/0035350 A1    Feb. 5, 2015

(51) Int. Cl.
*B60T 8/88* (2006.01)
*B60T 11/32* (2006.01)
*B60T 11/28* (2006.01)

(52) U.S. Cl.
CPC ............... *B60T 11/326* (2013.01); *B60T 11/28* (2013.01); *Y10T 137/7838* (2015.04)

(58) Field of Classification Search
CPC ....... B60T 8/262; B60T 8/263; B60T 11/101; B60T 11/32; B60T 11/326; B60T 17/226; B60T 17/227
USPC ........ 303/9, 9.62, 9.63, 9.66, 122.09, 122.15, 303/63, 84.1, 84.2; 188/349, 151 A; 137/493.6
See application file for complete search history.

(56) References Cited

U.S. PATENT DOCUMENTS

| | | | | | |
|---|---|---|---|---|---|
| 2,161,642 | A | * | 6/1939 | Stroup | 137/493.4 |
| 2,232,113 | A | * | 2/1941 | Katcher | 137/493.3 |
| 3,195,567 | A | * | 7/1965 | Cummings | 137/493.4 |
| 3,385,062 | A | * | 5/1968 | Cadmus | 60/590 |
| 3,512,846 | A | * | 5/1970 | Sheppard | 303/84.2 |
| 3,610,698 | A | * | 10/1971 | Gachot et al. | 303/2 |
| 3,625,248 | A | * | 12/1971 | Lhotellier | 137/493.6 |
| 3,680,314 | A | * | 8/1972 | Toomey | 60/567 |
| 3,760,912 | A | * | 9/1973 | Braun | 188/345 |
| 3,900,230 | A | * | 8/1975 | Durling | 303/84.2 |
| 3,914,942 | A | * | 10/1975 | Bacardit | 60/581 |
| 4,919,492 | A | * | 4/1990 | Samuelson et al. | 305/3 |
| 6,179,391 | B1 | | 1/2001 | Eberling et al. | |
| 2007/0262637 | A1 | * | 11/2007 | Bennett | 303/3 |

OTHER PUBLICATIONS

Bendix, "Service Data, Bendix SR-7 Spring Brake Modulating Valve", Bendix Commercial Vehicle Systems LLC, 2011, (Eight (8) pages).

* cited by examiner

*Primary Examiner* — Nicholas J Lane
(74) *Attorney, Agent, or Firm* — Crowell & Moring LLP

(57) ABSTRACT

A brake system and a valve device for a brake system are provided which provide at least partial front brake actuation in the event of a failure in the front brake pneumatic supply circuit. The valve device may be configured as a biased orifice double check valve which permits compressed air flow from the front brake pneumatic supply circuit to a front brake actuator during normal brake operation, but in the event of lack of sufficient front brake pneumatic pressure permits compressed air to be supplied to the front brake actuator from a rear brake pneumatic supply circuit, as well as permitting compressed air in the front brake actuator to be ventilated back through the rear brake pneumatic supply circuit when the brake is released.

4 Claims, 5 Drawing Sheets

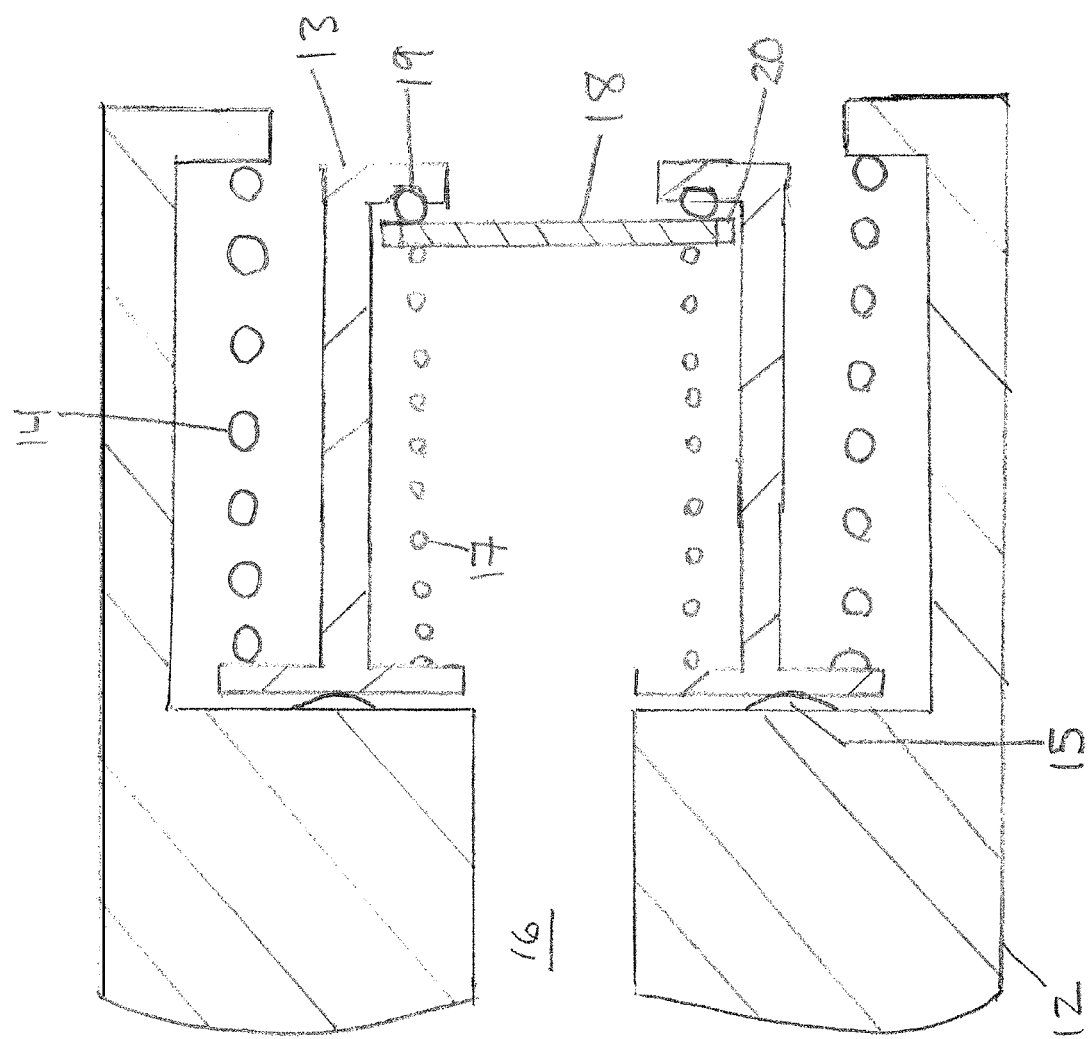

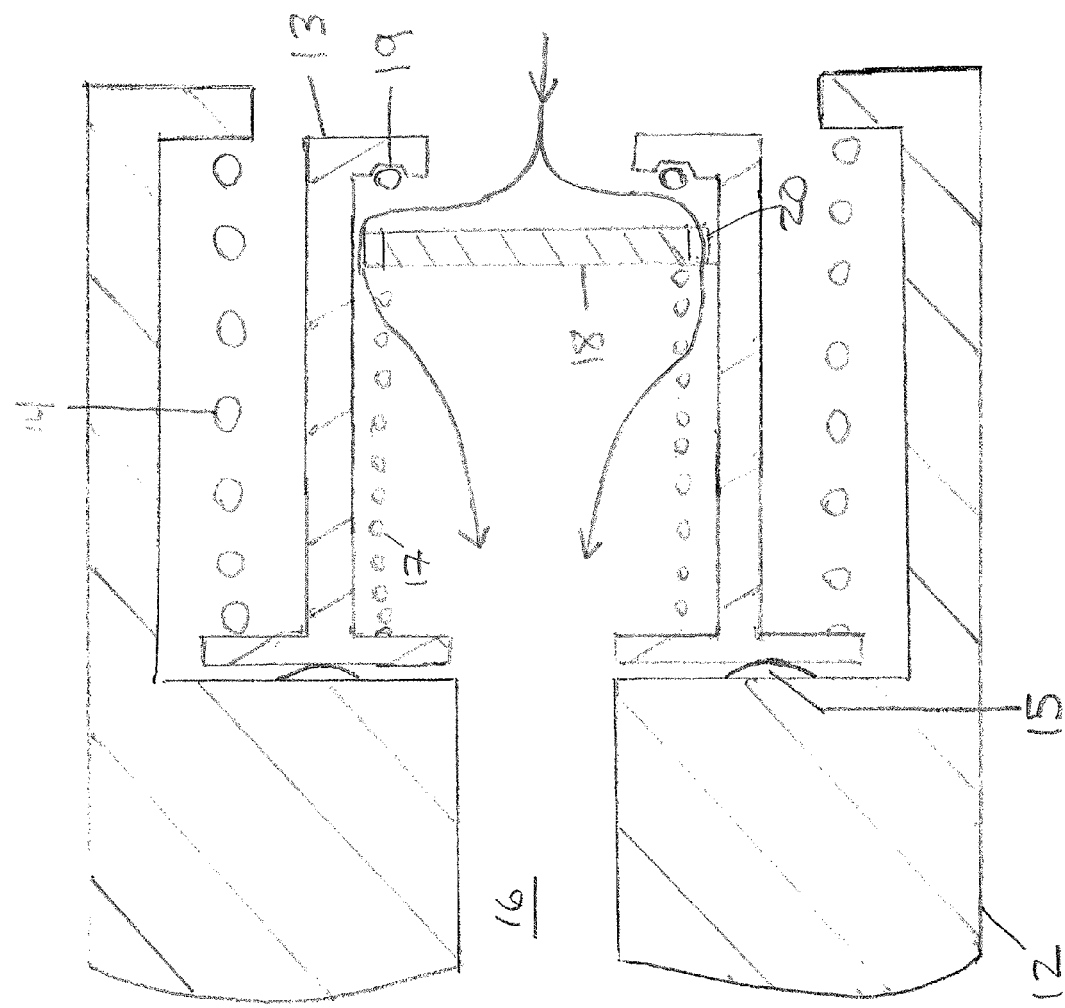

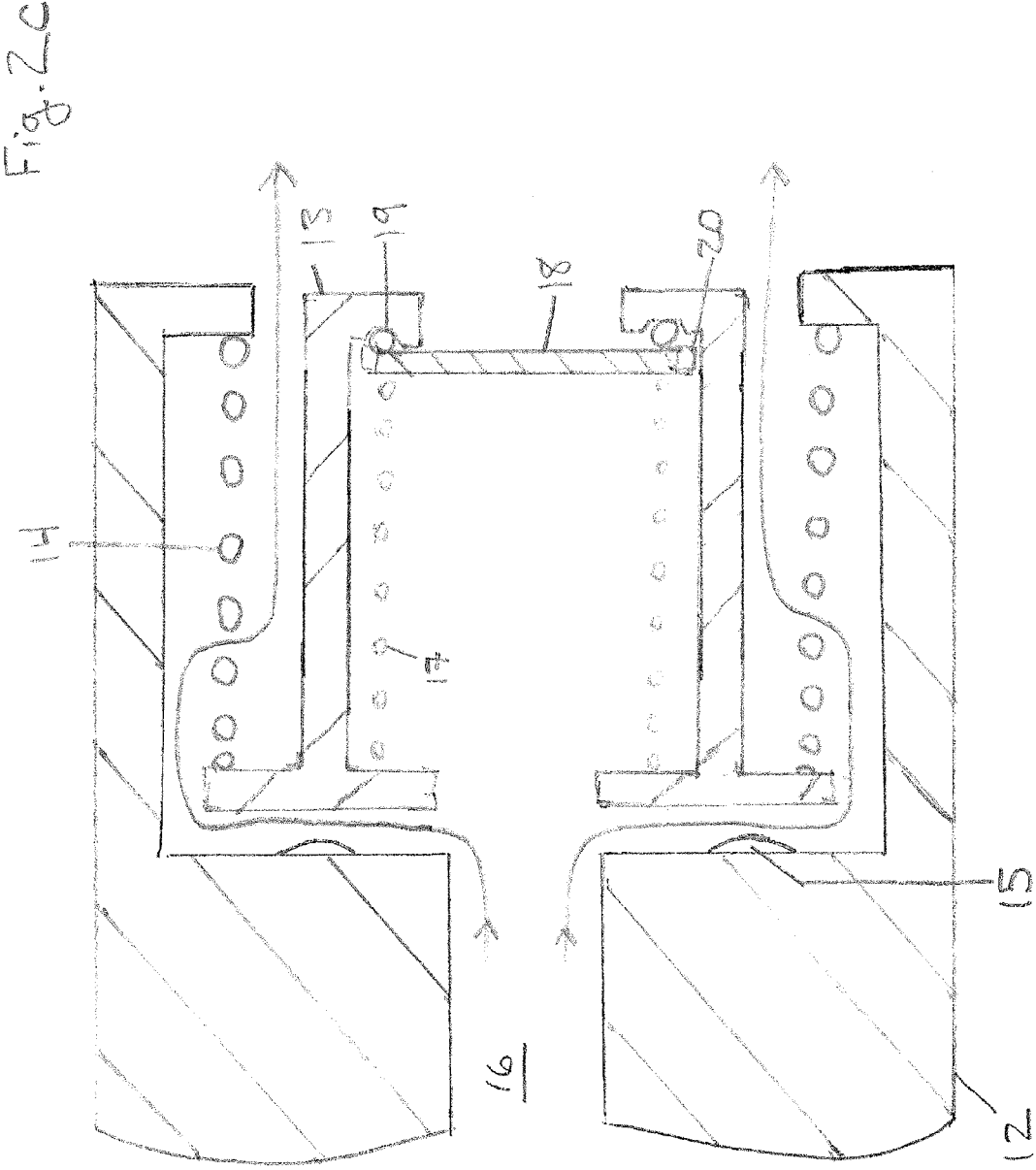

BIASED DOUBLE CHECK VALVE FOR BRAKE SYSTEM

BACKGROUND AND SUMMARY OF THE INVENTION

The invention relates to a pneumatic brake system, and in particular to a device permitting continued brake operability and compressed air flow control in the event of a system emergency such as a rupture in a pneumatic supply line.

Vehicles, particularly commercial vehicles such as trucks and buses, typically have pneumatic braking systems. These pneumatic brake systems typically include air-operated actuators for applying disc brakes or drum brakes at the wheels of the vehicle. The air-operated actuators (also known as spring brake actuators due to their being provided with a powerful spring which automatically applies the brake when pneumatic pressure to the actuator is lost) are supplied with compressed air to their service brake-operating portions by networks of pneumatic air lines and hoses. The air lines are typically controlled via relay valves which control the distribution of compressed air to the various brakes in response to pneumatic and/or electrical control signals delivered from a driver brake actuating device (such as a brake pedal) and/or an electronic controller (such as an anti-lock braking system controller).

There is a wide variety of known arrangements for compressed air brake actuation distribution in various commercial vehicles, with individual vehicle pneumatic line arrangements adapted as desired to the particular type of vehicle and the design objectives of the system. For example, a commercial vehicle having separate tractor and trailer units typically has separate readily-disconnectable brake line circuits dedicated to control of the trailer's brakes, and a dedicated pneumatic circuit for the tractor's brakes. Other commercial vehicles such as so-called "straight" (e.g., box trucks with all wheels mounted on a single frame) trucks and "bobtail" tractors (e.g., "4×2" vehicles with one front axle and one rear axle) may have separate pneumatic circuits for the front and rear axle brakes.

One variation on pneumatic brake systems is the so-called "dual air system" front brake arrangement, in which braking air may be supplied from front and/or rear brake circuits to operate the brakes.

There are proposals to establish new stopping distance requirements in Federal Motor Vehicle Safety Standard, FMVSS 121, including a shortened requirement for stopping distance in the event of failed front brakes (i.e., and emergency braking event) on dual air brake systems of straight trucks and 4×2 trucks. The new stopping distance requirements are particularly challenging to meet, as they require the vehicle to be unloaded (empty), a condition which minimizes the load over the rear wheels and thus does not permit the rear brakes to generate a significant amount of emergency braking force.

This and other objectives are addressed by the present invention, which provides an approach to meeting the emergency braking requirements in a manner intended to address the requirements while avoiding excessive system complication and additional system production and maintenance costs.

In one embodiment of the present invention, a valve device is provided between the pneumatic lines serving the front air brakes and the lines servicing the rear brakes. The valve device may for example be located on an engine compartment firewall or other bulkhead The valve device would permit rear brake compressed air to be provided to the front brakes in the event of an emergency braking event via an orificed air supply. A front brake system failure may include failures which block or prevent flow in the front brake compressed air supply circuit (such as a failure which prevents an air supply relay valve from opening) or a rupture of a circuit supply line. In the event of the latter, an orifice is provided in the valve device to avoid massive air loss from both the primary and secondary compressed air supplies. The valve device may also be configured to provide a biased differential pressure to the front brakes that is lower than the normal brake control pressure to prevent increased air system timing which would be necessitated if both braking systems were directly plumbed to the front brake actuators.

This two-way valve device may be in the form of a biased-orificed double check valve. In such an arrangement, the biased orifice prevents air flow from the rear pneumatic brake circuit to the front brake circuit during normal system operation (i.e., in the absence of a failure condition in the front brake circuit). During a front brake failure event, the biased-orificed double check valve would permit front brake application using rear brake circuit compressed air, while also slowing the loss of air from the rear brake circuit during the front brake failure event, and ensuring a high level of air flow in the release direction as the release air flow flows around the orifice.

Other objects, advantages and novel features of the present invention will become apparent from the following detailed description of the invention when considered in conjunction with the accompanying drawings.

BRIEF DESCRIPTION OF THE DRAWINGS

FIGS. 2a, 2b and 2c are detailed partial cross-section views of the two-way biased orifice double check valve in the FIG. 1 embodiment in normal front brake application, failed front circuit brake application and failed front brake release, respectively.

DETAILED DESCRIPTION OF PREFERRED EMBODIMENTS

Figure 1:
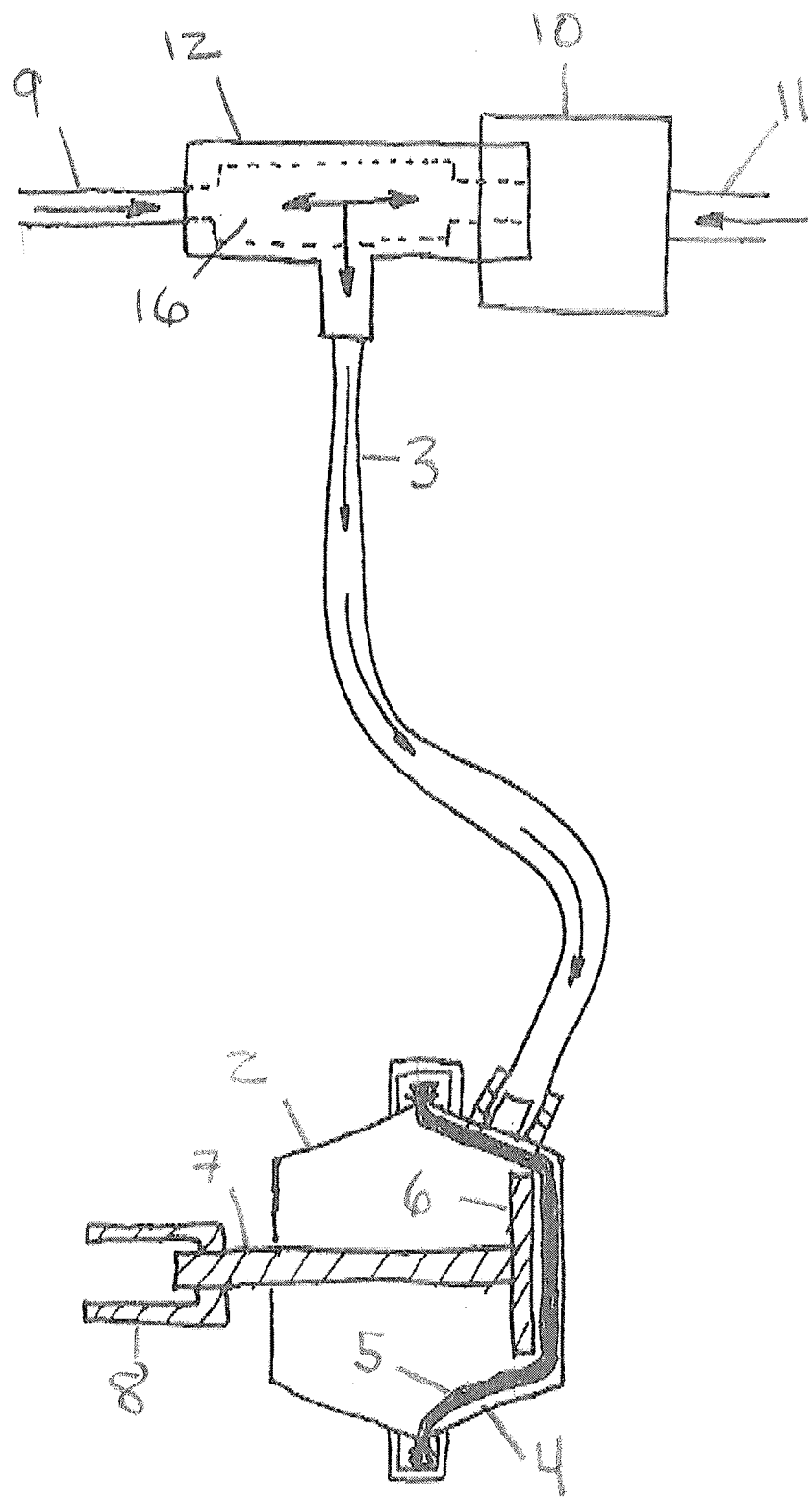
FIG. 1 is schematic illustration of a brake system equipped with a two-way biased orifice double check valve in accordance with an embodiment of the present invention.

FIG. 1 shows a schematic illustration of a brake system 1 equipped with a valve device in accordance with the present invention. In this embodiment a brake actuator 2 receives compressed air for operating a front axle brake (not illustrated) via supply line 3. The compressed air received in the actuator 2 enters a chamber 4 above a diaphragm 5, which presses the brake actuator's piston 6 to extend pushrod 7 is a brake application direction. The clevis 8 on the brake-end of pushrod 7 is coupled to an actuating lever of the front brake (not illustrated) to transfer the motion of pushrod 7 into the brake. When the brake is released, the compressed air in chamber 4 is vented back through supply line 3 to allow the diaphragm 5 and piston 6 to move in the brake release direction.

During normal system operation, the compressed air for applying the front axle brake is supplied from front brake circuit 9 to supply line 3, in this embodiment via a pneumatic line connection on bulkhead 10, and the air being vented from the actuator 2 to release the brake flows back through the front brake circuit 9.

This embodiment of the present invention is also provided with a compressed air supply connection from the rear brake circuit 11, and a biased orifice double check valve 12 which is described in greater detail, below. During normal brake operation, the compressed air pressure in the rear brake circuit 11 and the biasing forces of one or more spring elements in the double check valve 12 are applied to cut-off flow from the rear brake circuit toward the front brakes, and vice-versa.

In the event of a failure upstream of the double check valve 12 in the front brake circuit 9, compressed air is permitted to flow from the rear brake circuit 11 through the double check valve 12 to the actuator 2, thereby providing the brake system with the capability to generate at least partial front brake application force.

FIG. 2a provides a detailed cross-section illustration of the internal component arrangements in the double check valve 12 at the rear brake circuit-end of the valve. During normal front brake operation, a first check valve piston 13 is pressed by biasing spring element 14 and any air pressure in the rear brake circuit 11 against a seal 15 on a shoulder of the valve body, thereby preventing pneumatic flow in either direction across piston 13. At the same time, pneumatic pressure from front brake circuit 9 is applied via internal passage 16, along with a biasing force from second spring element 17 against an inner check valve plate 18 in order to seal the plate 18 against seal 19 to prevent flow from the front brake circuit 9 into the rear brake circuit 11. As schematically illustrated in FIG. 2a, the various piston 13 flanges and openings are sized to ensure that both check valves remain closed until a substantial pressure differential exists between the front and rear brake circuits in order to prevent cross-flow during normal brake operations.

FIG. 2b illustrates system operation in the event of a front brake circuit failure which precludes delivery of compressed air from the front brake circuit to front brake supply line. In this situation, the compressed air pressure in rear brake circuit 11 will be substantially higher than that in passage 16. As a result, the rear brake pressure will overcome the spring element 17's biasing force and displace the orifice plate 18 off its seal 19. This movement of plate 18 allows rear brake pneumatic pressure to pass into passage 16 (as indicated by arrows) and on through supply line 3 to the front brake actuator 2 to at least partially apply the front brake.

Figure 3:
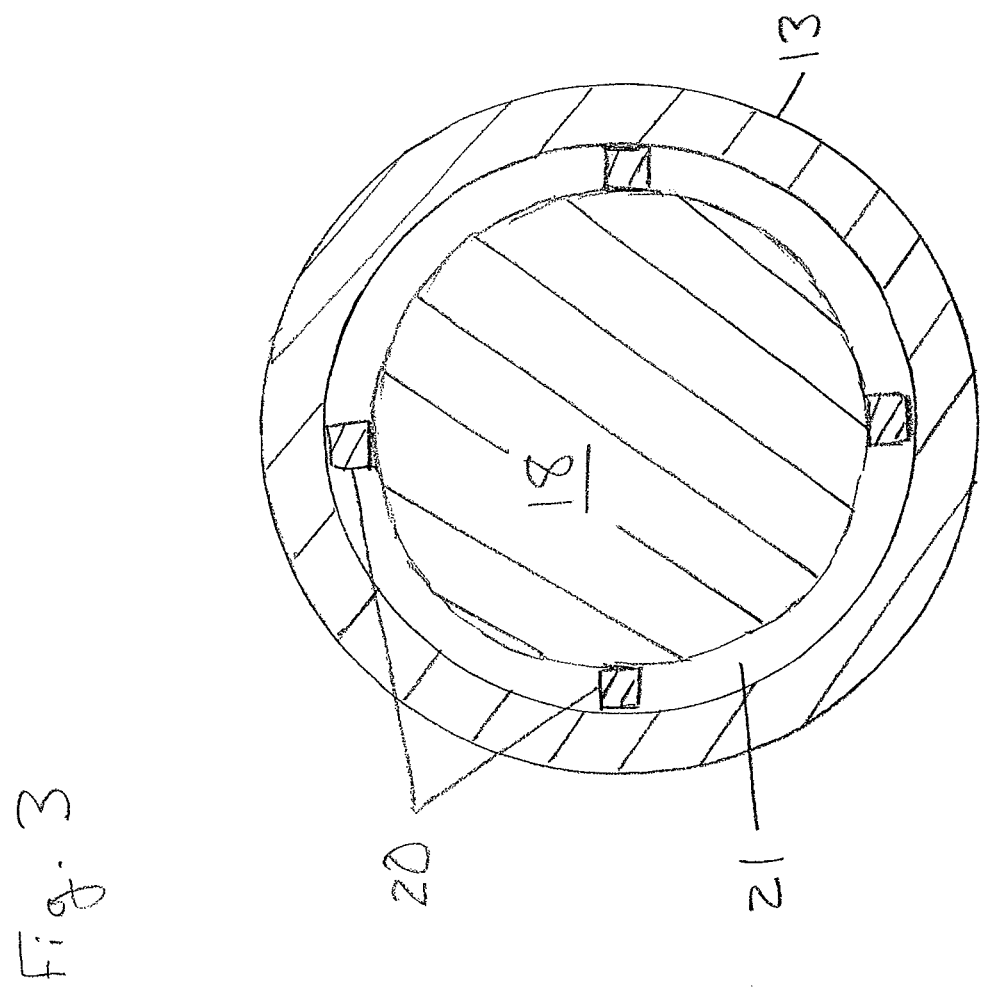
FIG. 3 is a detailed cross-section view of an orifice arrangement in the two-way biased orifice double check valve of FIGS. 2a-2c.

If the failure in the front brake circuit is due to a rupture in the front brake circuit 9 upstream of the double check valve and if there were no restriction in the flow past orifice plate 18 from rear brake circuit 11, a massive loss of compressed air from the rear brake circuit may occur. Accordingly, as shown in FIG. 3 the orifice plate 18 is sized to closely match the size of the interior of check valve piston 13 to minimize the cross-sectional flow area from the rear brake circuit side of plate 18. The orifice plate 18 in this embodiment is provided with a plurality of centering tabs 20 which maintain the plate centered within piston 13. The depth of the tabs 20 also help define the size of the flow area in the outer peripheral region 21 of the plate 18. The flow area may be selected in a manner which permits timely and effective delivery of pneumatic pressure from the rear brake circuit to the front brake actuator 2, balanced against the need to provide sufficient restriction to prevent rapid blow-down of the rear brake circuit through a ruptured line in the front brake circuit. The flow areas must also be located in a manner which allows the seal 19 to halt cross-flow when the check valve orifice plate 18 is fully seated against the seal.

It is important to note that the present invention is not limited to the orifice arrangements in this embodiment, as a wide variety of flow-restricting configurations may be used if rear brake blow down protection is to be provided. At a functional level, the present invention requires an arrangement in which cross flow is prevented during normal operation while still ensuring adequate flow from the rear brake circuit can be provided to the front brake actuator during a failure which blocks front brake circuit flow to the front brake actuator.

FIG. 2c shows system operation during brake release during a front brake circuit failure event. In order to release the front brake, the compressed air present in chamber 4 must be ventilated rapidly from the chamber. If flow from the actuator back into front brake circuit 9 is blocked, when the rear brake circuit pneumatic pressure drops (for example, when the driver releases the brake pedal), the drop in pressure in rear brake circuit 9, combined with the residual pneumatic pressure in passageway 16 supplied from front brake actuator 2, causes the orifice plate 18 to move into contact with seal 19. The application of the residual pressure in passage way 16 to the full cross-section of check valve piston 13 then overcomes the biasing force of the spring element 14, moving piston 13 away from seal 15 to allow flow from passageway 16 back into rear brake circuit 11 (as indicated by arrows) and subsequent release. The outer diameter of piston 13 may be sized relative to the body of double check valve 12 to provide a large flow cross-sectional area, and thus a high pressure release rate from front brake actuator 2.

An additional benefit of the arrangements in the FIG. 2a-2c embodiment is the ability to supplement brake application compressed air flow to the front brake in the event that the normal front brake circuit pressure is lower than normal to increase front brake application timing. In such a situation, brake application pressure typically will build in the rear brake circuit 11 more rapidly than in the front brake circuit 9. The strength of the second biasing spring element 17 may be set to allow the orifice plate 18 to move off its seal 19 when a predetermined differential pressure between the rear and front brake circuits is reached, permitting the rear brake circuit 11 to supplement the compressed air flow to the front brake actuator 2 to help build front brake application force more rapidly.

The foregoing disclosure has been set forth merely to illustrate the invention and is not intended to be limiting. For example, the biased orifice double check valve arrangements are not limited to a single valve device in a single brake circuit, but may be applied with multiple such valve devices in a vehicle, and may be applied in vehicles having multiple pneumatic pressure supply lines which enable individual wheel braking control. Nor is the application of such a valve device limited to supply of pneumatic pressure from a rear brake circuit to a front brake circuit, for example, connections between separate left/right brake circuits or from a front brake circuit to a rear brake circuit would fall within the scope of the present invention. Since modifications of the disclosed embodiments incorporating the spirit and substance of the invention may occur to persons skilled in the art, the invention should be construed to include everything within the scope of the appended claims and equivalents thereof.

What is claimed is:

1. A brake system, comprising:
   a pneumatically-operated front brake actuator;
   a front brake pneumatic supply circuit;
   a rear brake pneumatic supply circuit; and
   a valve device, wherein the valve device includes
      a passage fluidly coupling the front and rear brake pneumatic supply circuits and a supply line for the front brake actuator, a first check valve assembly located between the rear brake pneumatic supply circuit and the supply line for the front brake actuator and configured to be biased in a first check valve assembly closing direction, and a second check valve assembly located between the rear brake pneumatic supply circuit and the supply line for the front brake actuator and configured to be biased in a second check valve assembly closing direction, wherein the first check valve assembly includes a piston biased in a first check valve assembly closing direction by a first biasing element, the second check valve assembly includes an orifice plate arranged within the first check valve assembly piston over an aperture in an end region of the piston, the orifice plate being biased in a second check valve assembly closing direction by a second biasing element, the first check valve assembly includes a first seal member arranged between the first check valve piston and a body of the valve device to prevent pneumatic flow between the passage and the rear brake pneumatic supply circuit when the first check valve assembly is in a closed position, the second check valve assembly includes a second seal member arranged between the first check valve piston and the orifice plate to prevent pneumatic flow between the passage and the rear brake pneumatic supply circuit when the second check valve assembly is in a closed position, the second seal member is arranged radially inward from flow openings of the orifice plate, the first biasing element is a first spring, the first check valve assembly closing direction is toward the passage, the second biasing element is a second spring, and the second check valve assembly closing direction is toward the rear brake pneumatic supply circuit.

2. The brake system of claim 1, wherein the piston, the aperture in the end region of the piston, the first spring and the second spring are sized such that during normal braking operation the first spring and the second spring maintain their respective check valve assemblies in their closed positions, when a pressure difference between the front and rear brake pneumatic supply circuits exceeds a first predetermined pressure difference, the first check valve assembly permits pneumatic flow from the rear brake pneumatic supply circuit to the front brake actuator, and when a pressure difference between the front brake actuator and the rear brake pneumatic supply circuit exceeds a second predetermined pressure difference, the second check valve assembly permits pneumatic flow from the front brake actuator to the rear brake pneumatic supply circuit.

3. A valve device, for providing brake circuit failure protection, comprising:

a valve device body;

a passage formed in the valve device body fluidly coupling first and second pneumatic supply circuits with a brake actuator supply line;

a first check valve assembly located between the second pneumatic supply circuit and the brake actuator supply line, the first check valve assembly including a piston biased in a first check valve assembly closing direction by a first biasing element; and a second check valve assembly, the second check valve assembly including an orifice plate arranged within the first check valve assembly piston over an aperture in an end region of the piston, the orifice plate being biased in a second check valve assembly closing direction by a second biasing element, wherein the first check valve assembly includes a first seal member arranged between the first check valve piston and the valve device body to prevent pneumatic flow between the passage and the second pneumatic supply circuit when the first check valve assembly is in a closed position, the second check valve assembly includes a second seal member arranged between the first check valve piston and the orifice plate to prevent pneumatic flow between the passage and the second pneumatic supply circuit when the second check valve assembly is in a closed position, the second seal member is arranged radially inward from flow openings of the orifice plate, the first biasing element is a first spring, the first check valve assembly closing direction is toward the passage, the second biasing element is a second spring, and the second check valve assembly closing direction is toward the second pneumatic supply circuit.

4. The valve device of claim 3, wherein the piston, the aperture in the end region of the piston, the first spring and the second spring are sized such that during normal braking operation the first spring and the second spring maintain their respective check valve assemblies in their closed positions, when a pressure difference between the first and second pneumatic supply circuits exceeds a first predetermined pressure difference, the first check valve assembly permits pneumatic flow from the second pneumatic supply circuit to the brake actuator supply line, and when a pressure difference between the brake actuator supply line and the second pneumatic supply circuit exceeds a second predetermined pressure difference, the second check valve assembly permits pneumatic flow from the brake actuator supply line to the second pneumatic supply circuit.

* * * * *